United States Patent
Grayson

(10) Patent No.: US 10,949,432 B1
(45) Date of Patent: Mar. 16, 2021

(54) METHOD AND SYSTEM FOR RECOMMENDING DOMAIN-SPECIFIC CONTENT BASED ON RECENT USER ACTIVITY WITHIN A SOFTWARE APPLICATION

(71) Applicant: INTUIT INC., Mountain View, CA (US)

(72) Inventor: David Grayson, Menlo Park, CA (US)

(73) Assignee: INTUIT INC., Mountain View, CA (US)

( * ) Notice: Subject to any disclaimer, the term of this patent is extended or adjusted under 35 U.S.C. 154(b) by 174 days.

(21) Appl. No.: 16/213,727

(22) Filed: Dec. 7, 2018

(51) Int. Cl.
- G06F 16/00 (2019.01)
- G06F 16/2457 (2019.01)
- H04L 29/08 (2006.01)
- G06F 9/451 (2018.01)
- G06N 3/04 (2006.01)
- G06Q 40/00 (2012.01)

(52) U.S. Cl.
CPC ...... *G06F 16/24578* (2019.01); *H04L 67/306* (2013.01); *G06F 9/453* (2018.02); *G06N 3/0472* (2013.01); *G06Q 40/123* (2013.12)

(58) Field of Classification Search
CPC ............... G06F 16/9535; G06F 16/22; G06F 16/24575; G06F 16/24578; G06F 16/337; G06F 16/90
USPC ................................................ 707/600–899
See application file for complete search history.

(56) References Cited

U.S. PATENT DOCUMENTS

| | | | | |
|---|---|---|---|---|
| 9,773,063 B2 * | 9/2017 | Shi | ....................... | G06F 16/9535 |
| 10,600,004 B1 * | 3/2020 | Misko | ..................... | G06N 7/005 |
| 2010/0313139 A1 * | 12/2010 | Watfa | .................... | G06F 16/337 715/745 |
| 2012/0016875 A1 * | 1/2012 | Jin | ....................... | G06F 16/9535 707/734 |
| 2013/0151539 A1 * | 6/2013 | Shi | ....................... | G06F 16/9535 707/754 |

(Continued)

OTHER PUBLICATIONS

Vera L Miguéis, Dirk Van den Poel, Ana S Camanho, and João Falcão e Cunha, "Predicting partial customer churn using markov for discrimination for modeling first purchase sequences," Advances in Data Analysis and Classification (2012) 6:337-353, DOI 10.1007/S11634-012-0121-3, 17 pages.

(Continued)

*Primary Examiner* — Michelle N Owyang
(74) *Attorney, Agent, or Firm* — Patterson + Sheridan, LLP

(57) ABSTRACT

Aspects of the present disclosure provide techniques for recommending content to users of an application based on a probability distribution over a set of articles generated from user activity history within the application. Embodiments include receiving a content request from a user of the application. A system retrieves, using a predictive model, predictive scores for items of content in response to the content request and user activity history within the application prior to the content request. The predictive model may be trained using user clickstream data for sessions executed within the application by a plurality of users, and information about actions performed within the application prior to a request may be correlated with content viewed by a user subsequent to the request. The system selects a group of the items of content to display to the user and displays the selected group of the items of content to the user.

20 Claims, 7 Drawing Sheets

(56) References Cited

U.S. PATENT DOCUMENTS

| | | | |
|---|---|---|---|
| 2013/0159192 A1* | 6/2013 | Partridge | G06Q 30/02 |
| | | | 705/50 |
| 2016/0078485 A1* | 3/2016 | Shim | H04W 4/021 |
| | | | 705/14.64 |
| 2017/0140285 A1* | 5/2017 | Dotan-Cohen | G06Q 10/04 |
| 2017/0161619 A1* | 6/2017 | Franceschini | G06N 5/022 |
| 2018/0341704 A1* | 11/2018 | Barkan | G06F 16/637 |
| 2019/0139092 A1* | 5/2019 | Nomula | G06Q 30/0255 |

OTHER PUBLICATIONS

Wang, G., Zhang, X., Tang, S., Wilson, C., Zheng, H., & Zhao, B. Y., "Clickstream user behavior models," ACM Transactions on the Web, Publication date Mar. 2017, 35 pages.

Arora, S., & Warrier, D., "Decoding fashion contexts using word embeddings," In KDD Workshop on Machine learning meets fashion, 6 pages.

Vieira, A., "Predicting online user behaviour using deep learning algorithms," arXiv preprint arXiv:1511.06247, May 27, 2016, 21 pages.

Hidasi, B., Karatzoglou, A., Baltrunas, L., & Tikk, D., Session-Based Recommendations With Recurrent Neural Networks, arXiv preprint arXiv:1511.06939, Mar. 29, 2016, 10 pages.

\* cited by examiner

| UserID | Activity | Timestamp |
|---|---|---|
| 1234 | WF_STEP1 | 11/1/2018 13:00 |
| 1234 | WF_STEP2A | 11/1/2018 13:07 |
| 1234 | WF_STEP2B | 11/1/2018 13:25 |
| 1234 | WF_STEP2C | 11/1/2018 13:45 |
| 1234 | WF_STEP2B | 11/1/2018 13:50 |
| 1234 | HELP_REQUEST | 11/1/2018 13:51 |
| 1234 | WF_STEP2D | 11/1/2018 14:13 |
| 1234 | WF_STEP3A | 11/1/2018 14:22 |
| 1234 | HELP_REQUEST | 11/1/2018 14:29 |

USER ACTIVITY HISTORY 510A

| UserID | ArticleID | Timestamp | Duration |
|---|---|---|---|
| 1234 | 6212b7c2 | 11/1/2018 13:52 | 0h 00m 05s |
| 1234 | f2fefc72 | 11/1/2018 13:52 | 0h 05m 23s |
| 1234 | 91514096 | 11/1/2018 13:58 | 0h 12m 11s |
| 1234 | 287c62ff | 11/1/2018 14:10 | 0h 03m 01s |

CONTENT INTERACTION HISTORY 520

USER VECTOR 530

METHOD AND SYSTEM FOR RECOMMENDING DOMAIN-SPECIFIC CONTENT BASED ON RECENT USER ACTIVITY WITHIN A SOFTWARE APPLICATION

INTRODUCTION

Aspects of the present disclosure generally relate to using probabilistic models to deliver content to a user of a software application. In particular, embodiments of the present disclosure involve analyzing recent behavior of users of a software application in order train a predictive model to select content to present to a particular user.

BACKGROUND

Software applications are generally deployed for use by many users for the performance of a specific function. These applications may be deployed, for example, as web applications accessible over a network, such as the Internet or a private network, or as desktop applications that include static components executed from a local device and dynamic components executed from content retrieved from a network location. These applications can include financial applications, such as tax preparation applications, accounting applications, personal or business financial management applications; social media applications; electronic communications applications; and so on. These software applications generally include help functions that users frequently interact with to obtain information about how to perform various tasks in the software application. Some applications may additionally provide execution environments for the use of third-party plugins, extensions, helpers, and other components to add functionality to these applications. These components may be available for user to download or otherwise link to an instance of a software application through an application store.

Help content related to the software application may aid a user in execution various functionality exposed by the software applications. The help content may include, for example, articles, tutorials, video content, community-generated content, forum posts, and other content that may be delivered to a user of the software application. To deliver help content to a user, a software application may include a help interface that allows users to search for and view help content. The help interface may be prepopulated with articles deemed to be useful to users of the software application, a table of contents listing the contents of a help repository associated with the application, a search interface allowing a user to execute a search against a help repository, or the like.

However, help interfaces pre-populated with a predefined set of content may display useful content for some users or content relevant to a particular scenario in the software application, but may not display useful content for other users or content relevant to other scenarios in the software application. For example, the pre-defined set of content may include articles relevant to typical scenarios that a user is expected to encounter within the software application, but may not include relevant content for unexpected or infrequent scenarios (e.g., "edge cases") within the software application. Further, help interfaces pre-populated with a table of contents may display available help content in a hierarchical format, but may only provide limited information about the available help content (e.g., the titles of articles in a set of help content associated with the software application). A search interface may allow a user of the software application to perform a keyword search on a set of help content associated with the software application, but may not reliably return relevant content to a user.

Similarly, application stores may list a wide variety of additional components that a user can add in order to add functionality to the application that was not already implemented by the application. These additional components may be applicable to groups of users of varying sizes. For example, in an accounting application, some downloadable components may be applicable to owners of small businesses, while other downloadable components may be applicable to owners of larger businesses. In another scenario, some downloadable components may be applicable to owners of a business, while other downloadable components may be applicable to service providers (e.g., accountants) to the business. Still further, different downloadable components may be applicable to different features within the application itself. In an application store that pre-populates a download interface with a pre-defined set of recommended downloadable components, the recommended downloadable components may include a set of frequently downloaded application components. However, this set of frequently downloaded application components may not include components relevant to a specific user or type of user of the application.

Accordingly, there are many situations in which the most relevant content for a user may not be readily identifiable and, worse, may be obfuscated by a significant amount of typical, but not otherwise useful content for a particular user's scenario. Thus, what is needed are techniques for delivering relevant content to a software application user based on the specific context in which the user is executing the software application.

BRIEF SUMMARY

Certain embodiments provide a computer-implemented method for presenting recommended content to a user of a software application. The method generally includes detecting execution of a triggering event with a software application by a user of the software application. A system obtains user activity history prior to execution of the triggering event for the user of the software application and requests, from a predictive model, predictive scores for a set of content items based on the obtained user activity history prior to execution of the triggering event. The predictive model may be trained using vectors including user activity history within the software application and content interaction history recorded for a plurality of users of the software application. Each vector includes information about user actions performed within the software application prior to the triggering event and content viewed by a user subsequent to the triggering event. The predictive scores indicate a likelihood that each content item in the set of content items would be relevant to the user based on the obtained user activity history prior to execution of the triggering event. The system ranks the content items in the set of content items based on the predictive scores for each content item, selects a subset of the set of content items to display to the user based on the ranking of the content items, and outputs the selected subset of content items for display to the user of the software application.

Other embodiments provide a system comprising a processor and a non-transitory computer-readable medium storing instructions that, when executed by the processor, cause the processor to perform an operation for presenting recommended content to a user of a software application. The operation generally includes detecting execution of a triggering event with a software application by a user of the software application. A system obtains user activity history prior to execution of the triggering event for the user of the software application and requests, from a predictive model, predictive scores for a set of content items based on the obtained user activity history prior to execution of the triggering event. The predictive model may be trained using vectors including user activity history within the software application and content interaction history recorded for a plurality of users of the software application. Each vector includes information about user actions performed within the software application prior to the triggering event and content viewed by a user subsequent to the triggering event. The predictive scores indicate a likelihood that each content item in the set of content items would be relevant to the user based on the obtained user activity history prior to execution of the triggering event. The system ranks the content items in the set of content items based on the predictive scores for each content item, selects a subset of the set of content items to display to the user based on the ranking of the content items, and outputs the selected subset of content items for display to the user of the software application.

Still further embodiments provide a non-transitory computer-readable medium having instructions stored thereon which, when executed by one or more processors, perform an operation for presenting recommended content to a user of a software application. The operation generally includes detecting execution of a triggering event with a software application by a user of the software application. A system obtains user activity history prior to execution of the triggering event for the user of the software application and requests, from a predictive model, predictive scores for a set of content items based on the obtained user activity history prior to execution of the triggering event. The predictive model may be trained using vectors including user activity history within the software application and content interaction history recorded for a plurality of users of the software application. Each vector includes information about user actions performed within the software application prior to the triggering event and content viewed by a user subsequent to the triggering event. The predictive scores indicate a likelihood that each content item in the set of content items would be relevant to the user based on the obtained user activity history prior to execution of the triggering event. The system ranks the content items in the set of content items based on the predictive scores for each content item, selects a subset of the set of content items to display to the user based on the ranking of the content items, and outputs the selected subset of content items for display to the user of the software application.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
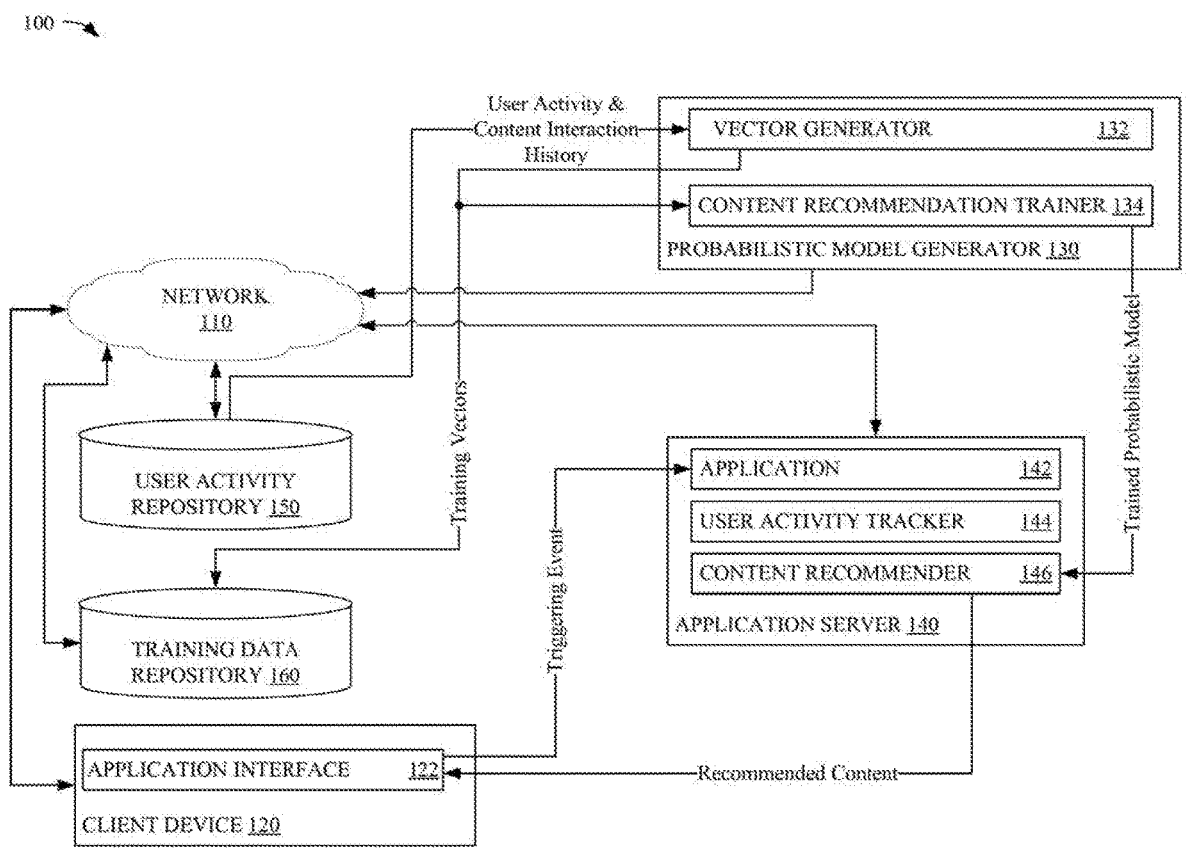
FIG. 1 illustrates an example network environment in which a probabilistic model is used to deliver recommended content to users of a software application based on user activity history within the software application.

Aspects of the present disclosure provide apparatuses, methods, processing systems, and computer readable mediums for delivering content to users of a software application based on user activity history within the software application. In particular, predictive models may be trained to rank the relevance of articles of content based on user activity within the software application.

In order to train a predictive model, a user activity history within an application may be reduced into a feature vector linking user activity within an application prior to a triggering event and content a user interacted with after the user invoked the triggering event (e.g., help articles, forum posts, videos, third party applications that a user can invoke, etc.).

As discussed herein, a triggering event may be an event defined within a software application indicative of a user request for recommended content in view of recent user activity executed within the software application. These triggering events may include, for example, a user request for help in using the application, a user request to open an application store to download application extensions or plugins, and other user requests that may trigger generation of recommended content. These triggering events may be generated from a user clicking on designated buttons in a user interface of the application, interpreted input received through a conversational user interface, or other input mechanisms in the application that a user can use to invoke a request for recommended content relevant to the user.

A plurality of feature vectors (e.g., for different users and for different invocations of the triggering event) may be used to train a predictive model such that an input of a user's activity history prior to the invocation of a triggering event may generate predictive scores for each content item in a set of content. The set of content may be a corpus of articles, videos, application downloads, and other information that may be delivered to a user of the application in response to a triggering event that requests delivery of recommended content to a user of the application. Each content item in the set of content is generally a discrete article, video, application download, or other piece of information that can be delivered to a user of the application. The predictive scores generally are representative of a likelihood that the user, given the user's activity history within the software application prior to invocation of the triggering event, will find each content item within the set of content to be useful (e.g., relevant to a problem a user is experiencing within a software application). Higher predictive scores may indicate that a user is more likely to interact with a specific content item (e.g., view the content item), and lower predictive scores indicate that a user is less likely to interact with a specific content item.

Using the trained predictive model, a content recommender can present a number of the highest-scoring content items to a user. By presenting high-scoring recommended content to the user based on user activity history for the user and other users, embodiments of the present disclosure improve the user's experience with a software application. Content that other users of the software application have interacted with and found to be useful in solving a similar problem may be delivered to a user of the application. Thus, content that is likely to be relevant to a user of the application based on the user's activity history prior to invoking the request for recommended content (e.g., a help request) may be delivered to a user instead of a default set of content items that may not address the user's problem or a search prompt. Further, by presenting recommended content to a user of the software application based on the user's activity history and other users' activity, embodiments of the present disclosure may reduce the amount of time that a user spends in obtaining content relevant to a problem that a user is experiencing within the application. The delivery of relevant content may reduce user irritation with a user experience delivered in the application, which may reduce a likelihood that the user will discontinue use of the application or migrate to a different application.

Example Networked Environment for Delivering Content Recommendations Based on User Activity and Predictive Modeling FIG. 1 illustrates an example networked environment 100 in which predictive models are trained and deployed for determining content items to deliver to a user in response to a triggering event. As illustrated, networked environment 100 includes a client device 120, probabilistic model generator 130, application server 140, user data repository 150, and training data repository 160, communicatively connected via network 110.

Client device 120 is illustrative of a variety of connected devices that may be used by a user to access application 142 on application server 140. Client device 120 may be, for example, a desktop computer, a laptop computer, a tablet device, a mobile phone, a smart device (e.g., a wearable smart device), or other computing device with networked communications capabilities. Client device 120 includes an application interface 122, which generally receives application content from application server 140 for display on client device 120. Application interface 122 further provides an interface for a user of the software application to interact with application 142 and content recommendations presented therein. While FIG. 1 illustrates execution of an application in a client-server environment, it should be recognized that application 142 may reside and execute locally on a client device 120 in some embodiments.

Probabilistic model generator 130 generally uses user activity data prior to the user invoking a triggering event and content interaction history recorded in application 142 after the user invokes a triggering event and stored in user activity repository 150 to generate feature vectors used in training a predictive model. These generated feature vectors, as discussed below, may be stored in training data repository 160 for use in training and re-training predictive models deployed to a content recommender 146 for delivering relevant content to a user of application 142. The predictive model is used by content recommender 146 to identify content to recommend to a user of application 142 by applying the predictive model to the user's activity history prior to invocation of the triggering event.

Probabilistic model generator 130 includes a vector generator 132 and a content recommendation trainer 134.

Vector generator 132 generally obtains user activity information from user activity repository 150 for a plurality of users of application 142 and generates vectors including user activity history prior to invocation of a triggering event and a content interaction history after invocation of the triggering event (e.g., content items the user viewed or otherwise interacted with after invocation of the triggering event). The vectors may be used by probabilistic model generator 130 (e.g., content recommendation trainer 134) to train content recommender 146. While the below discussion describes the generation of vectors using illustrative examples of user data in a tax preparation application, it should be recognized that the techniques described herein may be applicable in a variety of other applications and are not limited by the illustrative examples described herein.

Generally, user activity may be recorded in application 142 and stored in user activity repository 150 based on beacons associated with different portions of application 142. The beacons associated with different portions of application 142 generally refer to a payload generated by a user action or other information indicative of user activity within application 142 and may be stored as a record in user activity repository 150. The beacons may serve as features that may be predictive of the relevance of content items delivered to a user. The beacons may be independent of triggering events that causes content recommender 146 to identify a set of relevant content to display to a user of application 142. These beacons may include, for example, beacons associated with invocation of specific parts of a workflow (e.g., transitions between different steps of a workflow in the software application), invocation of actions in application 142 (e.g., initiation of calculations based on user input provided to application 142), or other events defined by the application 142 as events to be recorded in user activity repository 150 as user activity preceding invocation of a triggering event and the display of relevant content to a user of application 142. Each beacon may have a unique name or identifier, and lists of beacons recorded prior to invocation of a triggering event allows content recommendation trainer 134 to uniquely identify user activity that may be used as features for training a probabilistic model deployed to content recommender 146 to recommend relevant content to a user, as discussed in further detail herein.

By way of example, in a tax preparation application, beacons may correspond to different steps of a workflow in the tax preparation application. User activity information recorded by user activity tracker 144 and stored in user activity repository for a specific user may include information identifying steps in a tax preparation workflow that the user has executed and timestamps at which a user began interacting with each recorded step in the tax preparation workflow. Lists of activity corresponding to features of a generated vector may include, for example, the steps in the tax preparation workflow executed by the user prior to invoking a triggering invent of initiating a request to view help content related to a specific step within the tax preparation workflow. In some embodiments, application 142 may record timestamped data in user activity repository 150 identifying a beacon that a user has reached within application 142 and a timestamp identifying when a user has initiated interaction with that step of a workflow. For example, in a tax preparation application, application 142 may record that a user has executed a personal data entry step of a workflow at a first time, a wage income data entry step of the workflow at a second time, an investment income data entry step of the workflow at a third time, a partnership income data entry step of the workflow at a fourth time, a deduction calculation step at a fifth time, and so on. Each of the steps of the workflow may be associated with different beacons so that progress through the workflow may be recorded for use in predicting the content that will be relevant for the user of application 142.

In some embodiments, application 142 may also record timestamps at which a user invokes a triggering event. A triggering event may include, for example, a request for content executed within application 142, a request for content associated with application 142 and executed outside of application 142 while a user is logged into application 142, or other events that a user can invoke related to application 142.

After invoking a triggering event (e.g., initiating a request for help content for the application 142), content recommender 146 can present a set of content items determined to be relevant to a user of application 142 based on user activity history within application 142 prior to invocation of the triggering event. In some embodiments, the set of content items may be a "pre-search" result presented to the user in conjunction with a search interface that allows the user of application 142 to execute a search for content if the content items identified in the "pre-search" result are not relevant to the user. The user can access one or more content items from the presented set of content items to the user in response to invoking the triggering event. The presented set of content items may include content items determined to be relevant to the user based on user activity history within application 142 prior to invocation of the triggering event and a type of the triggering event. For example, if the triggering event is associated with a user clicking on a help button or otherwise requesting help content for the application, the presented set of content items may include help articles, videos, forum posts, and other information that may aid the user in operating application 142. In another example, if the triggering event is associated with a user clicking on an application store button to explore application plugins or extensions, the presented set of content items may include links to download application plugins or extensions that may be relevant to the user of application 142.

Each content item in the presented set of content items may be associated with a unique identifier (e.g., a Globally Unique Identifier (GUID), a hash of the content item, or other unique identifier). When a user accesses a content item in the presented set of content items, user activity tracker 144 can generate a record in user activity repository 150 of user interaction with that content item. The record may include the unique identifier of the accessed content item, a timestamp at which the user interacted with the accessed content item, and an amount of time a user spent viewing or otherwise interacting with the accessed content item. The recorded history of user interaction with content items presented in response to a triggering event may be used as label data in a vector that correlates user activity prior to invoking the triggering event (features) to content items the user interacted with in response to a presentation of a set of relevant content items delivered to the user (labels). These vectors, as discussed above, may be used to train a predictive model used by content recommender 146 to identify relevant content to deliver to a user of application 142 based on user activity (beacons) recorded in application 142 prior to invocation of a triggering event.

In some embodiments, the recorded amount of time a user spends viewing or otherwise interacting with an accessed content item from a presented set of content items may be used to determine whether the recorded interaction should, in fact, be treated as a non-interaction with the accessed content item. These non-interactions may be generated, for example, from an erroneous click on a link to the accessed content item, application errors causing application 142 to terminate shortly after a user clicked on a link to the accessed content item, or other situations where recorded interaction may not accurately indicate that a user actually intended to interact with the accessed content item.

To determine whether an interaction is actually a non-interaction and should not be recorded in a vector representative of content the user interacted with after invoking a triggering event, vector generator 132 can compare the recorded interaction time to a threshold value. If the recorded interaction time for a content item is less than the threshold value, the content item can be dropped from the set of content items retrieved from user activity repository. Otherwise, vector generator 132 can determine that a user actually intended to interact with the content item and can include that content item in the set of content items a user interacted with after invoking a triggering event in application 142.

In some embodiments, a triggering event may include a request to view third party applications (e.g., plugins or extensions to application 142) available for download from an application repository hosted and managed by a developer of application 142. The content items marked as accessed by the user in response to the triggering event may include, for example, the third party applications that a user downloaded or otherwise installed from the application repository. Other triggering events may be defined within application 142, and these defined triggering events may be associated with defined content item interactions to be recorded as the results of invoking the triggering events.

To generate a vector representative of a user's interaction with a software application prior to invocation of a triggering event and the user's interaction with content after invocation of the triggering event, vector generator 132 can obtain, from user activity repository 150, user activity information within application 142 and content interaction history for content delivered in response to the triggering event for that user from user activity repository 150. Vector generator 132 can order the obtained user activity information and content interaction history by timestamp and organize the user's activity information and content interaction into discrete lists of activity based on timestamps of triggering events recorded in user activity repository 150. For example, presume that a user has performed i steps of a workflow (e.g., steps 1-$i$ in the workflow) in the software application prior to invoking a triggering event and views j content items (e.g., content items having identifiers 1-$j$) in response to invoking the triggering event. Vector generator 132 can generate a first vector [step 1, step 2, . . . step i]→{content 1, content 2, . . . content j} and store the generated vector in training data repository 160. The first vector [step 1, step 2, . . . step i]→{content 1, content 2, . . . content j} may record that the user executed steps 1-*i* of the workflow prior to interacting with content items 1-*j*. In some embodiments, the j content items viewed by the user may include a first content item that a user interacted with and subsequent content items accessible, directly or indirectly, through links in the first content item to the subsequent content items.

In some embodiments, a resumption of user interaction with the workflow exposed by the software application may result in the generation of a new vector representing user activity. For example, presume that after viewing the j content items, a user executes the next k steps of the workflow (e.g., steps i+1 through i+k of the workflow), invokes a second triggering event, and views a second set of l content items (e.g., content items having identifiers j+1 through j+l). Vector generator 132 can generate a second vector [step i+1, step i+2, . . . step i+k]→{content j+1, content j+2, . . . content j+l} and commit this vector to training data repository 160 as an unrelated vector to the first vector in embodiments where workflow units defined for training the probabilistic models are defined on a per-triggering-event basis.

In some embodiments, linking the information included in the first and second vectors may provide a fuller picture of user interaction with the application 142 and content items the user interacted with during a user session within application 142. To link the user activity history and content interaction across different triggering events (e.g., the first and second triggering events), a "supervector" can be generated encompassing each of the user activity-content interaction vectors generated for a specific user's interaction history with the software application and associated content. This supervector may, for example, take the form of [step 1, step 2, . . . step i, content 1, content 2, . . . content j, step i+1, step i+2, . . . step i+k]→{content j+1, content j+2, . . . content j+l} and link user activity throughout the entirety of a user session within the software application to content viewed by the user at any given time during the user session.

In some embodiments, a user may invoke a triggering event without selecting any content items presented to the user. In such a case, the i steps of the workflow preceding invocation of the triggering event may be followed by a null set of content items that the user interacted with. Because the null set of content items may not result in useful data for training a predictive model, vector generator 132 may not commit the vector of [step 1, step 2, . . . step i]→{ } to training data repository 160 for use in training the predictive model.

Content recommendation trainer 134 may obtain the training data committed to training data repository 160 and generated by vector generator 132 to train a probabilistic model for recommending content items to users of application 142 based on user activity prior to invocation of a triggering event (e.g., a request for content while a user executes a workflow implemented by application 142). After probabilistic model generator 134 generates the probabilistic model, probabilistic model generator 134 can deploy the trained model to content recommender 146 for use in identifying relevant content for display to a user.

In some embodiments, the probabilistic model may be a long short-term memory (LSTM) recurrent neural network (RNN). By using a LSTM RNN, the probabilistic model may be configured to make predictions based on time series data, such as a sequence of events executed within application 142 over a period of time prior to invocation of the triggering event. When the probabilistic model is provided a list of user activity as input for analysis, the probabilistic model may generate an output of a set of scores for each item of content in a set of content items. The generated score for a particular content item in the set of content items generally represents a likelihood that a user would find the particular content item to be relevant to the user in view of the user's actions prior to invocation of the triggering event. In some embodiments, the scores may be a probability score calculated for each content item in the set of content items.

In some embodiments, the number of beacons representative of user activity within application 142 to be provided as input into a generated probabilistic model may be a hyperparameter optimized during training of the probabilistic model. The number of beacons hyperparameter may be optimized to achieve a balance of precision and processing speed, of which the number of beacons provided as input to the generated probabilistic model may serve as a proxy. For example, the number of beacons hyperparameter may be optimized against a rate at which the highest ranked recommended content item in the set of content items is selected for a number of inputs into content recommendation trainer 134. The rate at which the highest ranked recommended content item in the set is selected may be referred to as a precision value. The number of beacons hyperparameter may be adjusted to a number corresponding to a maximum precision value achievable for the highest ranked content item in the set of content items. Suppose, for example, that the precision value for an input of 10 beacons is 0.560, the precision value for an input of 15 beacons is 0.635, the precision value for an input of 20 beacons is 0.667, the precision value for an input of 25 beacons is 0.669, and the precision value for an input of 30 beacons is 0.670. Based on the plateauing of the precision value starting at an input of 20 beacons, the number of beacons hyperparameter can be set to 20 to achieve optimal precision (roughly a precision value of 0.67, rounded to two decimal places) and a smaller input size to achieve a faster processing speed.

In some embodiments, content recommendation trainer 134 can additionally use user attributes to personalize the generated probabilistic model and thus personalize the content identified by the generated probabilistic model as relevant to the user. The user attributes may include, for example, a duration of time a user has subscribed to or otherwise used application 142, types of product subscriptions the user owns, a number of external users to whom the user has granted account access to (e.g., a number of external accountants granted access to the user's data in application 142), a number of beneficiaries of the user's access to application 142 (e.g., employees attached to a user's payroll in an accounting application), whether the user is using a trial of paid subscription to application 142, additional features of the application 142 the user is subscribed to, to name a few. The user attributes may be used to customize a probabilistic model used to identify relevant content to deliver to a user of application 142 in response to a triggering event.

To customize the generated probabilistic model, the output of the probabilistic model may be converted into a dense vector including probability or predictive scores for each content item that is available in the application and merged with an auxiliary vector including the user attributes. The user information layer in the probabilistic model may be implemented as a final layer of the generated probabilistic model that makes content recommendation predictions based on user activity history within the application 142 and user attributes so that the content recommendations are customized to the user of application 142.

Application server 140 generally includes an application 142, a user activity tracker 144, and a content recommender 146. Application 142 may be any type of application in which users can execute functions provided by the application and request content related to the application (e.g., help content, third-party applications or plugins that interact with the application, etc.) during execution of the functions provided by the application. While accounting and tax preparation applications have been described above as examples of application 142, it should be recognized that application 142 is not limited to the accounting or tax preparation contexts. The techniques described herein may be applied to the recommendation of content in a variety of applications based on user interaction with features of the application prior to invoking a triggering event defined in the application (e.g., a request for help content related to the application).

Client device 120 may instantiate or initiate an instance of a session of application 142 in response to a request for application content received from client device 120. In some embodiments, the instance of a session of application 142 may be instantiated by a user accessing a home page of an application 142 structured as a web application. In other embodiments, an application interface 122 may instantiate the instance of application 142 by launching an executable file on client device 120 including native components that execute locally on client device 120 and use data provided by application 142. During execution of application 142, application 142 can receive a request to initiate a triggering event within application 142 from the user of application 142. As discussed, the triggering event may include, for example, a request for help content in the application 142, a request for information about third-party plugins or features related to a particular component of application 142, or other events that may be defined within application 142 as an event that triggers generation of a recommended set of content to be displayed to a user.

For example, in a tax preparation application, triggering events may include a request for help content invoked at any point in time during execution of application 142, requests for an explanation of why a calculation resulted in a particular result (e.g., an explanation of why a user's tax liability or refund amount is a particular amount, why a user is subject to certain taxes, why a user is eligible or ineligible for certain tax credits or deductions, etc.), or other events within application 142 for which a user may wish to obtain an explanation.

During execution of application 142, user activity tracker 144 may commit records to user activity repository 150 identifying a time at which a user executes various actions and views content within application 142. User activity tracker 144 may, for example, write records to user activity repository 150 as a three-tuple of {User Identifier, Activity Identifier, and Timestamp}. The user identifier may uniquely identify the user executing application 142 and invoking events within application 142. An activity identifier may, as discussed above, be associated with beacons defined within application 142 representing user execution of various events within the application 142. These beacons may include, for example, user commands to move between different steps in a workflow provided by application 142, invocation of calculation functions or other functions in application 142, user interface elements in application 142 that a user interacted with, or other events defined within application 142. In some embodiments, the recorded information about user activity with application 142 may further include context information about user interaction with the identified user interface components. User activity tracker 144 may, in some embodiments, additionally record the invocation of triggering events in application 142.

After a triggering event is invoked in application 142, as discussed in further detail below, content recommender 146 can generate a set of recommended content relevant to the user of application 142 based on user activity prior to invocation of the triggering event. The user activity recorded prior to invocation of the triggering event may serve as features to be provided as input into a model used by content recommender 146 to identify relevant content for the user. After the set of recommended content (or links to the set of recommended content) is displayed to the user through application interface 122, user activity tracker 144 may additionally track user interaction with the recommended content and other content accessible, directly or indirectly, through one or more items of the recommended content. User activity tracker 144 may record, in user activity repository 150, user interaction with content items delivered to the user.

In some embodiments, the records of user interaction with content items included in a presented set of relevant content items in response to invocation of a triggering event may also be written to user activity repository 150 for analysis and vector generation, as discussed above. In some embodiments, the records of user interaction with content items may be recorded as four-tuples of {User Identifier, Content Identifier, Timestamp, Duration}. As discussed, the duration information in a record of user interaction with a content identifier may be used to determine if recorded interaction with a content item was an erroneous selection or otherwise interaction with a content item that cannot be inferred to be an intentional selection of that content item.

In some embodiments, user activity tracker 144 can write records of user interaction with a content item to user activity repository 150 after determining that a user actually intended to interact with the content item. User intent to interact with the content item may be inferred based on a duration of interaction with the content item. If the user returns to a listing of the recommended content or closes a window in application interface 122 displaying a content item within a threshold amount of time after selecting the content item, user activity tracker 144 may infer that the user did not intended to interact with the content item and may not write a record to user activity repository 150. Otherwise, user activity tracker 144 may write a record to user activity repository 150 representing user interaction with the content item as a three-tuple of {User Identifier, Content Identifier, Timestamp} for use in training (or re-training) the probabilistic model deployed to content recommender 146. In embodiments where records of user interaction with a content item included in a set of relevant content items provided to a user in response to invocation of a triggering event, vector generator 132 need not analyze the records to determine if recorded interaction represents unintentional interaction that should not be included in a vector.

Content recommender 146 uses the probabilistic model generated by content recommendation trainer 134, as discussed above, to examine user activity within application 142 prior to invocation of a triggering event, and generate, from the user activity, a set of recommended content relevant to the user in the context of the examined user activity. To generate the set of recommended content, content recommender 146 aggregates the records associated with a user's activity prior to invocation of a triggering event and stored in user activity repository 150 into an input data set for the probabilistic model. Content recommender 146 then generates, for a set of content items available for display to a user of application 142, predictive scores indicating a likelihood that a user will interact with each content item in the set of content items. The set of content items available for display may, in some embodiments, include the universe of content items accessible to a user in response to a triggering event (e.g., the universe of help articles, videos, and forum posts associated with an application 142 where the triggering event is a request for help content, the universe of available application plugins and extensions in an application store where the triggering event is a request to add plugins or extensions to application 142, etc.). The predictive scores may be, for example, a probability score, a relevance score, or other score generated by content recommender 146 for a particular content item that may be displayed or otherwise made accessible to a user of application 142 (e.g., through a content pane or window displayed in application interface 122 on client device 120).

In some embodiments, content recommender 146 can sort the content items into an ordered list based on the predictive scores generated by content recommender 146 for the user activity prior to invocation of a triggering event provided as input into content recommender 146. Content recommender 146 can select a number n of content items for display to the user of application 142. For example, if content recommender 146 sorts the content items from highest predictive score to lowest, content recommender 146 can generate a result data set from the top n content items in the sorted list of content items and display links to the n highest-ranked content items to a user of application 142. In some embodiments, content recommender 146 may maintain the sorted list of content items for a user to traverse while attempting to find relevant information from the set of content items. In some embodiments, to reduce the size of the sorted list of content items, content recommender 146 can remove content items associated with low predictive scores from the sorted list. A low predictive score sufficient to remove a content item from the sorted list of content items may include predictive scores below a score relevance threshold value.

While prediction training system 130, application server 140, user data repository 150, and training data repository 160 are illustrated as separate components in FIG. 1, it should be recognized that prediction training system 130, application server 140, user data repository 150, and training data repository 160 may be implemented on any number of computing systems, either as one or more standalone systems or in a distributed environment.

Figure 2:
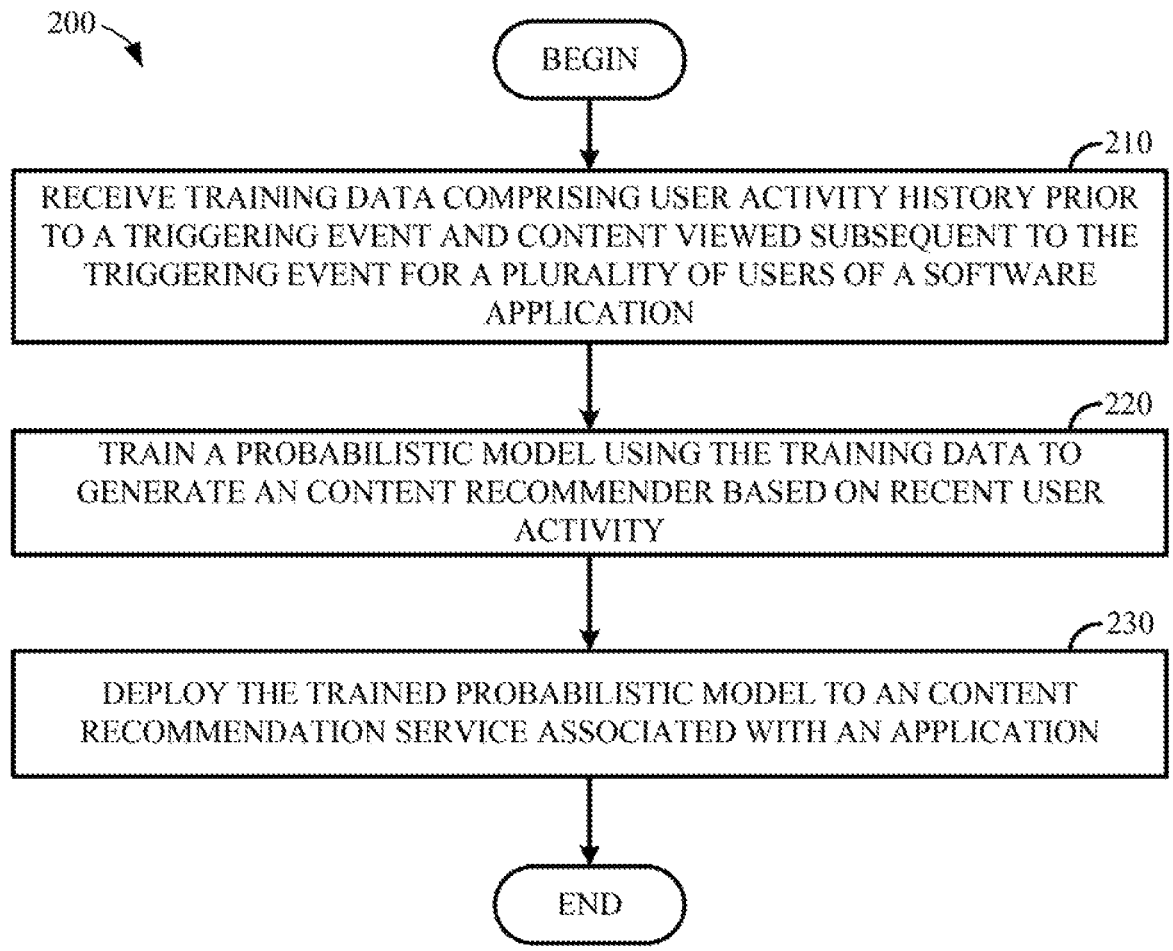
FIG. 2 illustrates example operations for training a probabilistic model for recommending content to a user of a software application based on user activity information prior to a triggering event and content viewed subsequent to the triggering event.

Example Computer Implemented Method for Delivering Content Recommendations Based on User Activity and Predictive Modeling FIG. 2 illustrates example operations 200 for training a probabilistic model for generating predictive scores representing a likelihood that content items will be relevant to a user based on user activity prior to invocation of a triggering event.

As illustrated, operations 200 begin at block 210, where a system receives training data for a plurality of users of a software application. As discussed above, the training data may include user activity history prior to a triggering event and content viewed subsequent to the triggering event. The training data may be retrieved from a user activity repository (e.g., user activity repository 150 illustrated in FIG. 1) and may comprise timestamped records identifying a time at which a user performed recorded activity in a software application. The records may identify, for example, user interaction with various components of a software and content items, such as articles, videos, user-generated content, third-party plugins or extensions usable within the software application, and the like. In some embodiments, the training data may be received from a training data repository (e.g., training data repository 160 illustrated in FIG. 1).

In some embodiments, where training data repository 160 comprises a null set or additional records have been saved to user activity repository 150 since records in the training data repository 160 were generated, the system can retrieve user activity history and content interaction history records from user activity repository 150 and generate a plurality of vectors based on the user activity history and content interaction history, as discussed above. The system can then save the generated vectors to training data repository 160 prior to training the probabilistic model. The vectors may represent user interaction with the software application prior to a triggering event and content a user interacted with subsequent to the triggering event.

To generate a vector for a particular list of user activity data, the system can identify triggering events in the user interaction history with the software application and user interaction activity prior to the triggering event. The user interaction activity prior to the triggering event may include beacons identified within the application for tracking user interaction in the application. These beacons may include, for example, transitions between different steps of a workflow in the application, interaction with specified user interface elements in the application, invocation of specified functions in the application, or other events for which user interaction in the application may be tracked. The content viewed subsequent to invocation of the triggering event may include content viewed or otherwise interacted with by a user of the software application between an invocation of the triggering event and the next recorded user interaction with the software application.

At block 220, the system trains a probabilistic model using the training data to generate a content recommender based on recent user activity. To train the probabilistic model, the system inputs the training data set of vectors representing relationships between user interaction with the software application prior to invocation of the triggering event and content viewed subsequent invocation of the triggering event into a machine learning model.

In some embodiments, additional user information may also be input into the machine learning model to customize the probabilistic model for additional user dimensions, such as a duration of time a user has subscribed to or otherwise used application 142, types of product subscriptions the user owns, a number of external users to whom the user has granted account access to (e.g., a number of external accountants granted access to the user's data in application 142), a number of beneficiaries of the user's access to application 142 (e.g., employees attached to a user's payroll in an accounting application), etc.

The machine learning model may include, for example, a long short-term memory neural network model that uses the generated vectors to learn temporal relationships between the ordered list of user activity prior to invocation of the triggering event and the content items a user interacted with subsequent to invocation of the triggering event. The output of the training may be a probabilistic model that analyzes each content item in a set of content items and generates a probability value indicating a likelihood that a user will interact with a given content item in the set of content items.

At block 230, the system deploys the trained probabilistic model to a content recommendation service associated with an application.

Figure 3:
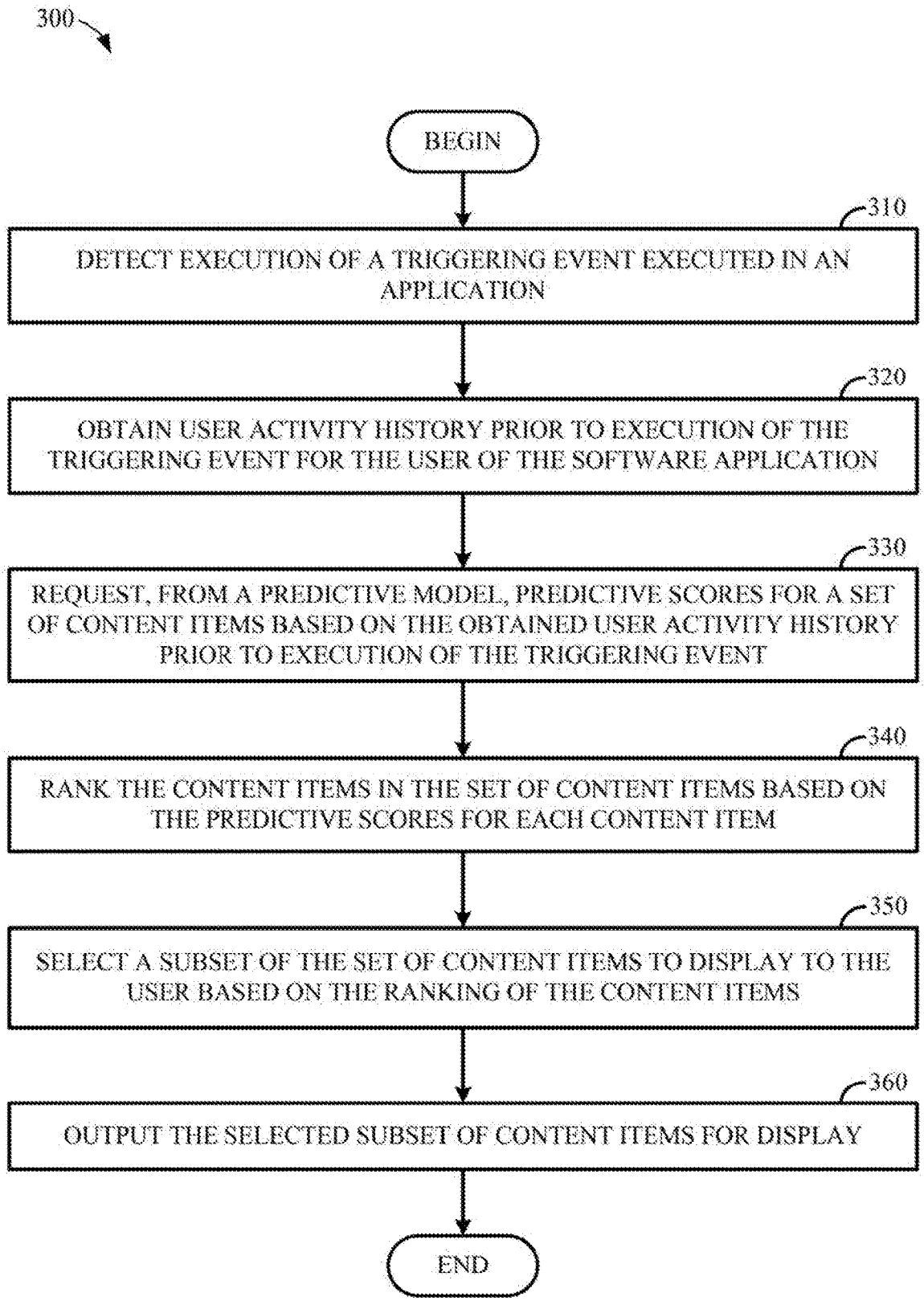
FIG. 3 illustrates example operations for delivering relevant content to a user of a software application based on a probability distribution over articles of content generated from applying a probabilistic model to user activity information.

FIG. 3 illustrates example operations 300 for generating a recommended set of content items for display to a user of a software application based on recent user activity within the software application.

Operations 300 begin at block 310, where a system detects the execution of a triggering event in an application. As discussed above, execution of the triggering event may include a request for content from, for example, a help system associated with an application, information requests associated with third-party extensions or plugins that can execute within the application, or other requests for recommended content within the application.

At block 320, the system obtains user activity history prior to execution of the triggering event for the user of the software application. As discussed, because the predictive (probabilistic) model is trained using user activity history information prior to invocation of a triggering event as features and user content interaction history subsequent to invocation of the triggering event as labels, the predictive (probabilistic) model may generate a probability distribution over a set of content items given a list of user interactions with the application as an input. To obtain the user activity history prior to execution of the triggering event, the system can request recorded user activity from a repository (e.g., user activity repository 150), locally-stored session data, activity reported from a client device when the triggering event is executed in the application, or other repositories in which user activity information may be stored.

At block 330, the system requests, from a predictive (probabilistic) model, predictive scores for a set of content items based on the obtained user activity history prior to execution of the triggering event. The information about the set of content items may include, for example, predictive scores indicating a likelihood that each content item in the set would be relevant to a user of the application based on the user's activity history within the application prior to execution of the triggering event. To request the predictive scores for a set of content items, as discussed above, the system can obtain recorded user activity prior to the triggering event (e.g., from user activity repository 150 in FIG. 1) and order the recorded user activity into a time-sequenced list of user activity that may be input into the probabilistic model for analysis. In response, the system receives predictive scores associated with each content item in the set of content items.

As discussed, the predictive scores may include probability scores for each content item in a set of content items that may be delivered to a user of the application, where each probability score indicates a likelihood that the user will interact with a given content item in the set of content items. The set of content items may vary based on a type of the triggering event executed at block 310. For example, if the triggering event is a request for help content, the set of content items may include help articles, videos, forum posts, and other content describing the operation of the application. In another example, if the triggering event is a request for information about application plugins or extensions, the set of content items may include information about each plugin or extension available in an application store for addition to application 142.

At block 340, the system ranks the content items in the set of content items based on the predictive scores for each content item.

At block 350, the system selects a subset of content items for display to the user of the application. The subset of content items may comprise n content items from the set of content items having the highest probability values in the set of content items.

In some embodiments, to select the subset of content items, the system can sort the content items into an ordered list based on the predictive scores associated with each content item in the set. Content items with higher predictive scores may be content items that are predicted to be relevant to the user in view of user activity prior to invocation of the training event based on similar content selections by users who have executed similar activities in the application.

At block 360, the system outputs the selected subset of content items to a client device for display. The output may include, for example, the titles of articles or descriptions of content items that a user may interact with, brief descriptions of the articles or other content items, and other information that may provide a summary of the items in the selected subset of content items. As discussed, the output may include links to the selected subset of content items such that selection of an item in the subset of content items causes retrieval of the selected item and transmission of the selected item to client device 120 for display.

Figure 4:
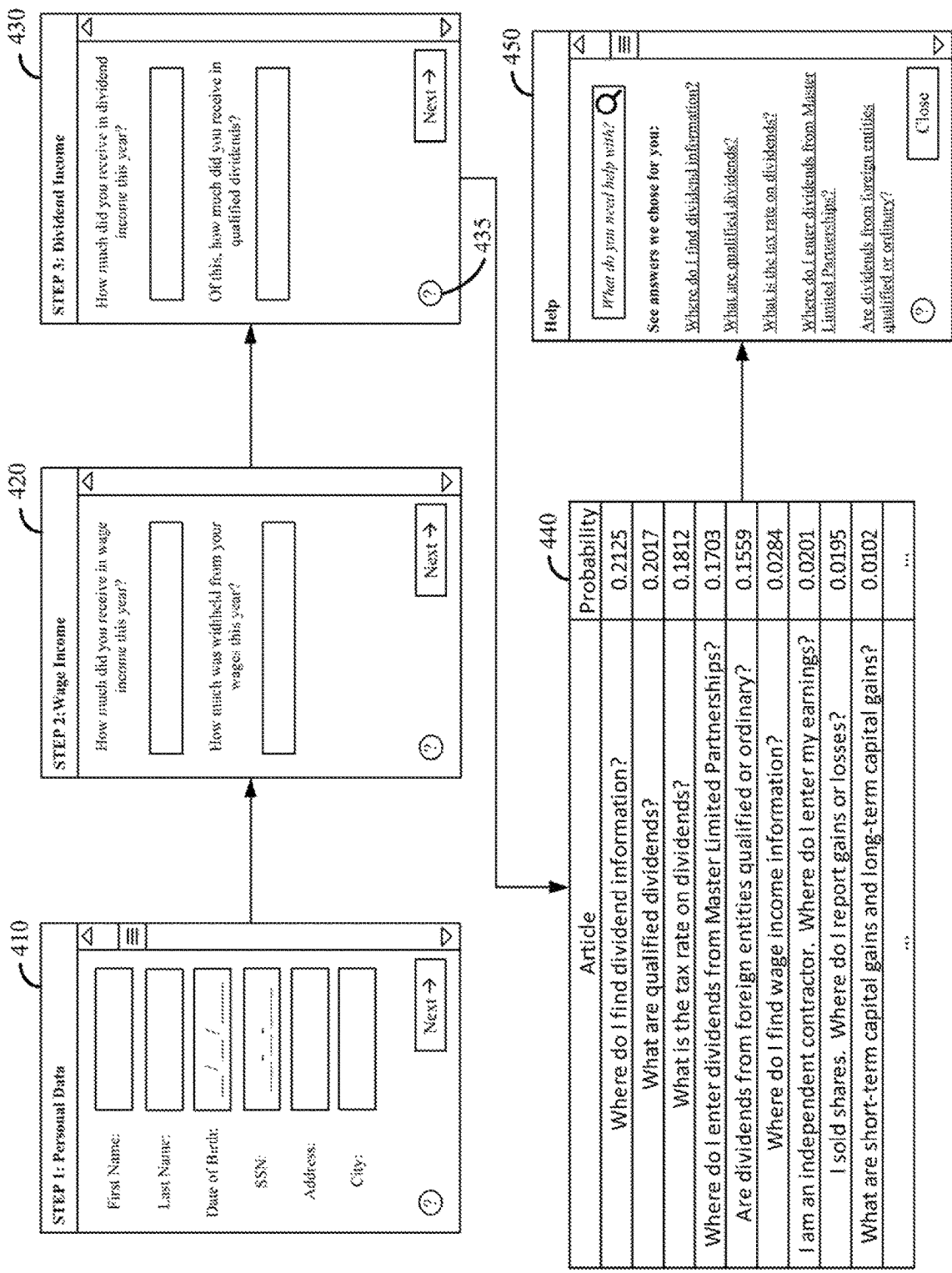
FIG. 4 illustrates an example sequence of user interface screens generated in an application to deliver recommended content based on user activity within the application prior to invocation of a triggering event.

Example Presentation of Recommended Content in an Application Based on Output of a Predictive Model for Delivering Content Recommendations FIG. 4 illustrates an example sequence 400 of activity in an application 142 in which recommended content is presented to a user based on the output of a predictive model for delivering content recommendations. As illustrated, application 142 may be a tax preparation application, and the triggering event may be a request for help content executed within the tax preparation application. It should be recognized, however, that the generation of recommended content based on the output of a predictive model may be used in other types of applications and in response to other types of triggering events.

As illustrated, sequence 400 may comprise user progression through a series of workflow steps 410, 420, 430 within application 142. As illustrated, workflow step 410 may be representative of a personal data entry step in the workflow; workflow step 420 may be representative of a wage income data entry step in the workflow; and workflow step 430 may be representative of an investment income data entry step in the workflow. As illustrated, when the user of application 142 reaches workflow step 430, the user clicks on help button 435 to request help content associated with workflow step 430 in application 142.

In response to the user clicking on help button 435, content recommender 146 can obtain, from user activity repository 150, information about the user's interactions with application 142. In this example, the predictive model may take three beacons as input into the model, though, as discussed above, this number may be adjusted to optimize the precision of the recommended content. As illustrated, user interaction with application 142 may include three records corresponding to workflow step beacons in application 142: progression to first workflow step 410, progression to second workflow step 420, and progression to third workflow step 430. The user interactions with application 142 may be organized into a feature vector representing steps [410, 420, 430] and input into a trained probabilistic model used by content recommender 146 to identify relevant content to display to a user in response to invocation of a triggering event (in this example, the user clicking on the help button).

Using the feature vector representing sequential user interaction with workflow steps 410, 420, and 430, content recommender 146 generates a probability distribution 440 over a universe of help content that can be delivered to the user of application 142. As illustrated, probability distribution 440 may include predictive scores associated with each item in the universe of help content.

In some embodiments, content recommender 146 can select the n highest-scoring content items in the universe of help content for presentation to a user of application 142. As illustrated, links to the selected n highest-scoring content items are displayed on screen 450 in response to the user clicking help button 435. As illustrated, the five highest-ranked items in probability distribution 440 are displayed on screen 450; however, any number of items may be displayed to a user.

User selection of content items from the selected n highest-scoring content items may be recorded in user activity repository 150 for future use in refining the probabilistic model used by content recommender 146 to deliver recommended content to a user of application 142. Similarly, if the user executes a search for content through the search interface displayed on screen 450, execution of the search and user selection of one or more search results may be recorded for future use in refining the probabilistic model used by content recommender 146.

Figure 5A:
FIGS. 5A and 5B illustrate example transformations of user activity data within an application prior to a triggering event and content interaction data after the triggering event into a vector representation for use in training a probabilistic model for obtaining a probability distribution over a set of articles used in recommending content to a user.
Figure 5B:
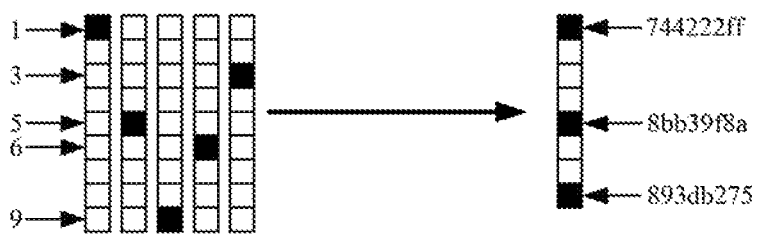

Example Vector Representing User Activity History and Content Item Interactions for Training a Predictive Model for Delivering Content Recommendations FIGS. 5A and 5B illustrate example user activity history information and content item interaction data (e.g., content viewing history information) used to generate vectors for training a probabilistic model that generates predictive scores representing a likelihood that a user will find content items to be useful based on recent user activity in an application.

FIG. 5A illustrates an example of sequential user activity within application 142 and content item interaction data that may be used to generate user vectors for training the probabilistic model. User activity history 510A and content interaction history 520A, as well as other data that may be used to train a content recommender to deliver relevant content to a user in response to invocation of a triggering event, may be stored in user activity repository 150. The vectors 530A generated from user activity history 510A and content interaction history 520A may be stored in training data repository 160 for use in training probabilistic models used by content recommender 146 to deliver content to a user of application 142.

As illustrated, user activity history 510A may include various pieces of information associated with a user's interactions with components of an application. The information may include, for example: user identifiers, activity indicators, and a timestamp associated with the activity indicators. As illustrated, the activity indicators include information about different steps of a workflow accessed by a user during execution of a software application. These different steps may be associated with unique identifiers within the application code (e.g., Globally Unique Identifiers (GUIDs), predefined identifiers unique to each component of an application, workflow step identifiers associated with specific portions of an application, node identifiers in an application defining a workflow as a graph of connected operations, etc.). The records in user activity history 510A may be generated and committed to user activity repository 150 upon the occurrence of predetermined events within application 142 (e.g., when a user clicks on a button to move from one step of a workflow to another step of the workflow). While the activity indicators illustrated in FIG. 5A include information about different steps of a workflow accessed during execution of a software application it should be recognized that other information defined as beacons in the application may be tracked and recorded for use in generating content relevance predictions and content recommendations. These beacons may include navigations between different pages and workflows, user data entry into specific data fields in application 142, selections of data in user interface elements displayed in application 142, invocation of various events in application 142 (e.g., to perform a calculation based on data provided by the user to application 142), and other events that may be used to predict content a user may be interested in viewing or otherwise interacting with at a later point in time.

User activity information 510A further includes information identifying when triggering events are invoked in application 142. The triggering events may be pre-defined for an application and may include requests for help content (e.g., in this example designated as "HELP_REQUEST"), requests for information about relevant plugins or applications for the application, and other events defined as triggering events in the application.

Content interaction history 520A generally tracks user interaction with content (or links to content) delivered to a user of client device 120 in response to user invocation of a triggering event and a delivery of recommended content in response to invocation of the triggering event. While illustrated in this example as articles a user viewed after invoking a triggering event (e.g., articles or other content in a help repository), it should be recognized that the content interaction history 520A recorded for a user may include various types of data relevant to a context in which content recommender 146 executes. For example, in a scenario where content recommender 146 is used to recommend application extensions or plugins available in an application store for application 142 that may be relevant to a user, content interaction history 520A may include information identifying application extensions or plugins that a user downloaded and/or added to their instance of application 142.

The content interaction history 520A may be used, in conjunction with user activity information 510A, to train a probabilistic model that generates predictive scores (e.g., probability scores) representing a likelihood that a user with a given list of activity prior to invocation of a triggering event will interact with content items associated with the application. As illustrated, content interaction history 520A may include information identifying the content a user interacted with (e.g., textual content loaded into a content viewing interface of application 142, video content loaded into a video player and played in a content viewing interface of application 142, etc.), a timestamp at which the user initiated interaction with a content item, and a duration of the user's interaction with the content item.

In some embodiments, the content interaction history 520A may include records of user interaction with content items that are likely to be erroneous records. For example, user interaction with the content item having an article identifier of "6212b7c2," having an interaction duration of 5 seconds, may be deemed to be a non-interaction with that content item because the interaction duration is less than some defined threshold value. Because the recorded interaction with the content item having an article identifier of "6212b7c2" may not represent an intentional interaction with that article in response to invoking a triggering event, the system need not include information about user interaction with article "6212b7c2" in a user vector. Omitting such interactions from a generated user vector 530A may prevent unintentional interactions with a content item from influencing how a probabilistic model calculates the probability of user interaction with content items for a given list of user activity within an application prior to invocation of a triggering event.

User vector 530A represents time-series training data that may be used to train a probabilistic model for delivering recommended content to a user of an application in response to invocation of a triggering event. As illustrated, user vector 530A may comprise a pair of vectors. The first vector may represent temporally ordered user activity prior to execution of a triggering event within an application, and the second vector may represent the label data, which may be information about the content viewed subsequent to the triggering event. For example, user vector 530A may map the list of events executed prior to the triggering event detected on 1 Nov. 2018 at 13:51 (e.g., the help request recorded at that time) to content items viewed subsequent to execution of the triggering event and, in some embodiments, prior to the occurrence of other non-trigger events in the system for a particular user.

In some embodiments, an event executed prior to the triggering event may be represented as a one-hot vector, where each event in a set of possible events is associated with an index along a vertical dimension, and the event executed at a particular point in time may be assigned a value of "1" at the appropriate index in the one-hot vector. The series of one-hot vectors may be arranged to form a two-dimensional feature vector representing events executed within the application (on the vertical axis, as illustrated) over time (on the horizontal axis, as illustrated). The records of content items viewed subsequent to execution of the triggering event, illustrated as the set {f2fefc72, 91514096, 287c62ff} in user vector 530A, may be represented as a single multi-hot vector. In this multi-hot vector, the indices in the vector corresponding to the viewed content items are assigned a value of "1" (corresponding to the filled squares illustrated in the multi-hot vector) and the indices corresponding to content that was not viewed are assigned a value of "0" (corresponding to the blank squares illustrated in the multi-hot vector).

As illustrated, then, the ordered list of user activity starting from workflow step 1 and proceeding to workflow steps 2A, 2B, 2C, and back to 2B may be mapped to content items "f2fefc72," "91514096," and "287c62ff." This vector, and similar vectors generated for user activity in a software application (e.g., application 142 illustrated in FIG. 1) may be used to train a predictive model used in identifying relevant content to deliver to a user in response to invocation of a triggering event based on the user's interaction history with the application. As discussed, the trained predictive model may be configured to take an ordered list of user activity within an application prior to invocation of the triggering event and generate a probability distribution over a set of content that can be delivered to a user of the application. The probability distribution may indicate a likelihood that a user with interact with each content item in the set of content items if presented to the user, in response to the triggering event, as relevant content.

While FIG. 5A illustrates generation of user vectors from a linear sequence of events, it should be recognized that user vectors may be generated from non-linear sequences of events. For example, the generation of user vectors may be based on navigation between different (non-continuous) pages, different steps of a workflow, or different possible execution paths of the same workflow. Because of the variability in the possible execution paths a user can perform within an application 142, static pre-population of content recommendations based on user context (e.g., where a user is within an application) may be infeasible. By using predictive models described herein to generate content recommendations based on user activity history with application 142, content recommendation systems can account for complexity of user behavior within application 142 and use activity and content interaction histories of other users to deliver relevant content to a user of application 142.

FIG. 5B illustrates generation of user vectors from a non-linear sequence of events. As with user activity history 510A and content interaction history 520A described above with respect to FIG. 5A, user activity history 510B and content interaction history 520B, as well as other data that may be used to train a content recommender to deliver relevant content to a user in response to invocation of a triggering event, may be stored in user activity repository 150. The vectors 530B generated from user activity history 510B and content interaction history 520B may be stored in training data repository 160 for use in training probabilistic models used by content recommender 146 to deliver content to a user of application 142 in situations where a user can execute steps in a workflow non-sequentially.

As illustrated in user activity history 510B, a user may execute a number of steps of a workflow in a non-sequential order prior to executing a triggering event. In this example, the user has executed steps 1, 5, 9, 6, and 3 in that order prior to executing the triggering event of a help request within application 142. In response, after filtering out unintentional content interaction (as discussed above) from content interaction history 520B, the user has interacted with articles having the identifiers of "744222ff", "8bb39f8a", and "893db275". The ordered list of activity prior to execution of the triggering event may be mapped to content items "744222ff", "8bb39f8a", and "893db275" to generate user vector 530B which, along with other user vectors representative of user activity within the application prior to execution of a triggering event and content interaction subsequent to execution of the triggering event, may be used to train a predictive model used in identifying relevant content to deliver to a user in response to invocation of a triggering event based on the user's interaction history with the application.

Figure 6:
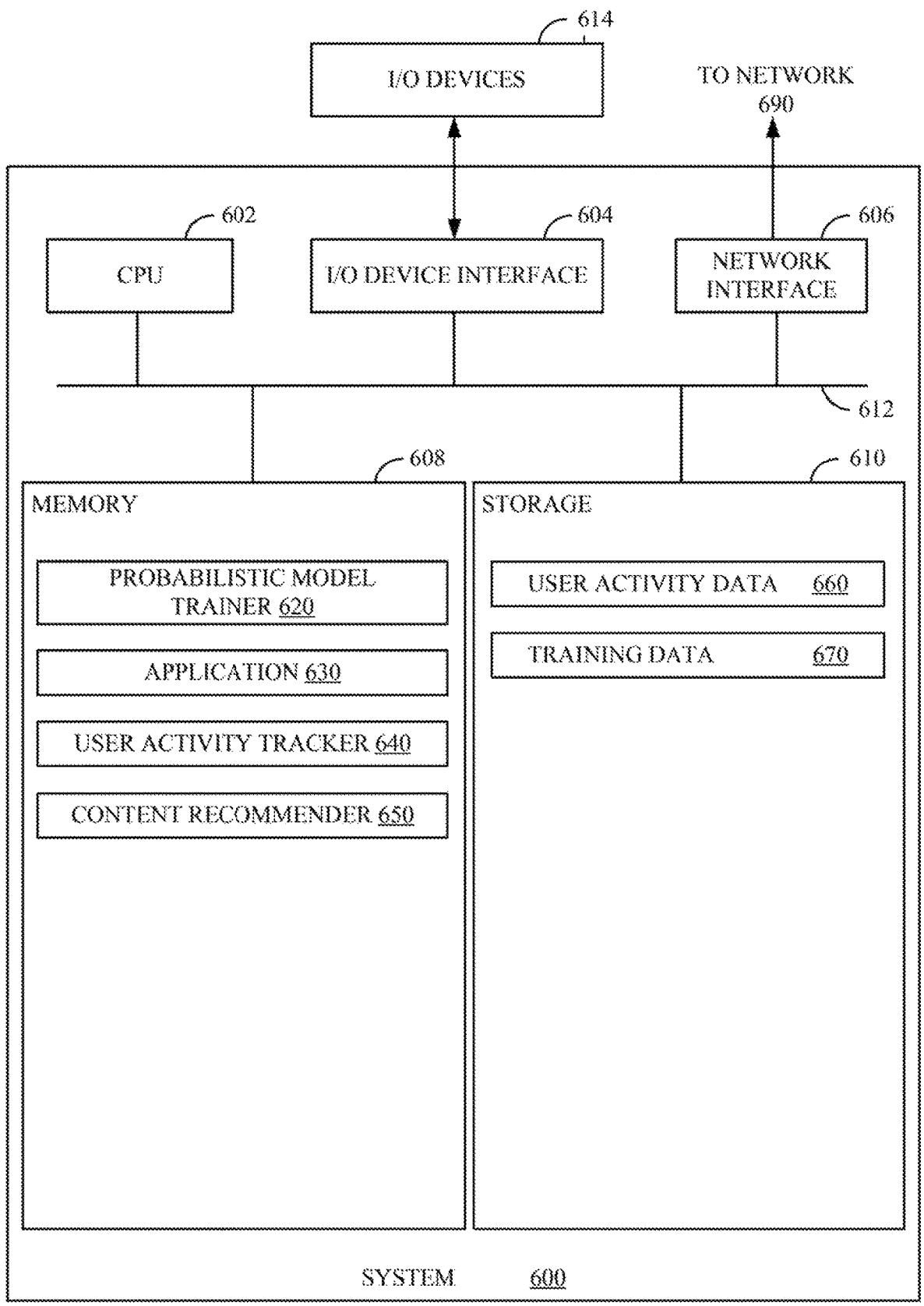
FIG. 6 depicts an example computing system with which embodiments of the present disclosure may be implemented.

Example System for Delivering Content Recommendations Based on User Activity and Predictive Modeling FIG. 6 illustrates an example system 600 for intelligently presenting targeted offers to users of a software application, according to embodiments of the present disclosure. For example, system 600 may be representative of prediction training system 130 and application server 140 in FIG. 1.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, one or more special-purpose processing units (e.g., a graphics processing unit (GPU), parallel compute units, an application-specific integrated circuit (ASIC), etc.) and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes a probabilistic model trainer 620, an application 630, a user activity tracker 640, and a content recommender 660. While probabilistic model trainer 620, application 630, user activity tracker 640, and content recommender 660 are illustrated as separate components in FIG. 6, it should be recognized that the functionality of probabilistic model trainer 620, application 630, user activity tracker 640, and content recommender 660 may be implemented in one or more functional modules loaded into memory 608 for execution by CPU 602. Probabilistic model trainer 620 is generally configured to train a probabilistic model by applying training vectors associating user activity prior to invocation of a triggering event to content items a user interacted with after invocation of the triggering event. The training vectors may be obtained from a data repository, such as training data 670 in storage 610, or generated from user activity information stored in a data repository, such as user activity data 660. The probabilistic model generated by probabilistic model trainer 620 may be deployed to content recommender 660 for execution.

Application 630 generally allows for a user to instantiate a session of the application to perform one or more functions exposed by the application. While application 630 is executing, user activity tracker 640 can monitor and record user interaction with functionality exposed by application 630 and commit records of recorded user interaction within application 630 to a data store (e.g., user activity data 660 in storage 610). The recorded user interaction generated by user activity tracker 640 may be used by content recommender 650 to deliver a recommended set of content items to a user of application 630. The recommended set of content items may be generated by obtaining predictive scores representing a likelihood that a user will find content items to be useful to a given scenario based on how other users have interacted with application 630. These predictive scores may include, for example, probability scores representing a likelihood that a user will interact with a given content item. Higher predictive scores generally indicate that a user is more likely to interact with a given content item, while lower predictive scores generally indicate that a user is less likely to interact with a given content item.

Storage 610 comprises user activity data 660 and training data 660. As discussed above, user activity data 660 may include timestamped records of user interaction with various features of application 630 and content a user viewed or otherwise interacted with after invoking a triggering event. The user activity data 660 may be processed by probabilistic model trainer 620 to generate the vectors stored in training data 670. These vectors generally associate a list of activity performed in application 630 prior to invocation of a triggering event to content items a user interacted with subsequent to the triggering event. Over time, user activity data 660 and training data 670 may be augmented as additional users interact with application 630, receive content recommendations from content recommender 650, and interact with content items included in the received content recommendations or accessible, directly or indirectly, through links in content items included in the received content recommendations.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A developer interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for presenting recommended content to a user of a software application, comprising:
  detecting execution of a triggering event with a software application by a user of the software application;
  obtaining user activity history prior to execution of the triggering event for the user of the software application;
  generating, for each respective executed event in the obtained user activity history, a one-hot vector, wherein
    the one-hot vector includes a number of bits corresponding to each of a plurality of events in the software application,
    one bit of the number of bits in the one-hot vector is set to high, and
    a position in the one-hot vector of the bit set to high corresponds to an identifier, in a set of unique identifiers, of the respective executed event in the software application;
  generating a two-dimensional representation of the obtained user activity history prior to execution of the triggering event by sequentially concatenating the one-hot vectors generated for each respective event in the obtained user activity history, wherein the two-dimensional representation of the obtained user activity history encodes timing relationships on a first axis and events executed within the software application on a second axis;
  requesting, from a predictive model, predictive scores for a set of content items based on the two-dimensional representation of the obtained user activity history prior to execution of the triggering event, wherein:

the predictive model has been trained using vectors correlating user activity history within the software application correlated to content interaction history recorded for a plurality of users of the software application, each vector correlates information about user actions performed within the software application prior to the triggering event and content viewed by one of the plurality of users subsequent to the triggering event, and the predictive scores indicate a likelihood that each content item in the set of content items would be relevant to the one of the plurality of users based on the obtained user activity history prior to execution of the triggering event;

ranking the content items in the set of content items based on the predictive scores for each content item;

selecting a subset of the set of content items to display to the user based on the ranking of the content items; and outputting the selected subset of content items for display to the user of the software application.

2. The method of claim 1, wherein the information about the user actions performed prior to the triggering event comprise beacons identifying user interface components the user interacted with.

3. The method of claim 1, further comprising:
obtaining, from user activity history, a collection of data representing user activity within the software application prior to execution of the triggering event and content interaction history representing user interaction with content delivered in response to execution of the triggering event; and
generating the one-hot vectors based on the obtained collection of data.

4. The method of claim 3, wherein generating the one-hot vectors comprises:
identifying, in the collection of data, a first occurrence of the triggering event;
selecting, from the collection of data, user activity within the software application having timestamps between the first occurrence of the triggering event and a second occurrence of the triggering event having an earlier timestamp than a timestamp associated with the first occurrence of the triggering event;
selecting, from the collection of data, user content interaction having timestamps between the first occurrence of the triggering event and a next user activity record having a timestamp after the first occurrence of the triggering event; and
generating a training vector with the selected user activity as a feature of the training vector and the selected user content interaction as a label of the training vector.

5. The method of claim 3, wherein generating the one-hot vectors comprises: generating a supervector representative of user interaction within the software application and user interaction with content over a plurality of discrete executions of the triggering event.

6. The method of claim 1, further comprising:
recording user selections of content items from the selected subset of content items; and
adding the user selections of the content items from the selected subset of content items to the user activity history.

7. The method of claim 6, wherein the recorded user selection comprises user selection of a plurality of content items performed between detecting execution of the triggering event and detecting execution of a second content request.

8. The method of claim 6, wherein adding the user selections of the content items to the user activity history comprises:
recording a duration of user interaction with a selected content item; and
upon determining that the recorded duration exceeds a threshold interaction time, committing a record of the user interaction with the selected content item to the user activity history.

9. The method of claim 1, wherein:
the predictive model comprises a long short-term memory (LSTM) neural network model, and
the predictive model outputs a probability distribution over a set of content items representing a likelihood that each item in the set of content items will be relevant for a given input of user activity in the software application.

10. The method of claim 9, wherein the predictive model is further configured to generate the predictive scores for items of content to be displayed to the user based on user attributes appended to an output of the LSTM neural network model.

11. A system, comprising:
a processor; and
a memory having instructions stored thereon which, when executed by the processor, perform an operation for presenting recommended content to a user of a software application, the operation comprising:
detecting execution of a triggering event with a software application by a user of the software application;
obtaining user activity history prior to execution of the triggering event for the user of the software application;
generating, for each respective executed event in the obtained user activity history, a one-hot vector, wherein:
the one-hot vector includes a number of bits corresponding to each of a plurality of events in the software application,
one bit of the number of bits in the one-hot vector is set to high, and
a position in the one-hot vector of the bit set to high corresponds to an identifier, in a set of unique identifiers, of the respective executed event in the software application:
generating a two-dimensional representation of the obtained user activity history prior to execution of the triggering event by sequentially concatenating the one-hot vectors generated for each respective event in the obtained user activity history, wherein the two-dimensional representation of the obtained user activity history encodes timing relationships on a first axis and events executed within the software application on a second axis;
requesting, from a predictive model, predictive scores for a set of content items based on the obtained user activity history prior to execution of the triggering event, wherein:
the predictive model has been trained using vectors correlating user activity history within the software application correlated to content interaction history recorded for a plurality of users of the software application, each vector correlates information about user actions performed within the software application prior to the triggering event and content viewed by one of the plurality of users subsequent to the triggering event, and the predictive scores indicate a likelihood that each content item in the set of content items would be relevant to the one of the plurality of users based on the obtained user activity history prior to execution of the triggering event;

ranking the content items in the set of content items based on the predictive scores for each content item;

selecting a subset of the set of content items to display to the user based on the ranking of the content items; and outputting the selected subset of content items for display to the user of the software application.

12. The system of claim 11, wherein the operation further comprises:

obtaining, from user activity history, a collection of data representing user activity within the software application prior to execution of the triggering event and content interaction history representing user interaction with content delivered in response to execution of the triggering event; and generating the one-hot vectors based on the obtained collection of data.

13. The system of claim 12, wherein generating the one-hot vectors comprises:

identifying, in the collection of data, a first occurrence of the triggering event;

selecting, from the collection of data, user activity within the software application having timestamps between the first occurrence of the triggering event and a second occurrence of the triggering event having an earlier timestamp than a timestamp associated with the first occurrence of the triggering event;

selecting, from the collection of data, user content interaction having timestamps between the first occurrence of the triggering event and a next user activity record having a timestamp after the first occurrence of the triggering event; and generating a training vector with the selected user activity as a feature of the training vector and the selected user content interaction as a label of the training vector.

14. The system of claim 12, wherein generating the one-hot vectors comprises: generating a supervector representative of user interaction within the software application and user interaction with content over a plurality of discrete executions of the triggering event.

15. The system of claim 11, further comprising:

recording user selections of content items from the selected subset of content items; and adding the user selections of the content items from the selected subset of content items to the user activity history.

16. The system of claim 15, wherein the recorded user selection comprises user selection of a plurality of content items performed between detecting execution of the triggering event and detecting execution of a second content request.

17. The system of claim 15, wherein adding the user selections of the content items to the user activity history comprises:

recording a duration of user interaction with a selected content item; and upon determining that the recorded duration exceeds a threshold interaction time, committing a record of the user interaction with the selected content item to the user activity history.

18. The system of claim 11, wherein:

the predictive model comprises a long short-term memory (LSTM) neural network model, and the predictive model outputs a probability distribution over a set of content items representing a likelihood that each item in the set of content items will be relevant for a given input of user activity in the software application.

19. The system of claim 18, wherein the predictive model is further configured to generate the predictive scores for items of content to be displayed to the user based on user attributes appended to an output of the LSTM neural network model.

20. A non-transitory computer-readable medium having instructions stored thereon which, when executed by one or more processors, perform an operation for presenting recommended content to a user of a software application, the operation comprising:

detecting execution of a triggering event with a software application by a user of the software application;

obtaining user activity history prior to execution of the triggering event for the user of the software application;

generating, for each respective executed event in the obtained user activity history, a one-hot vector, wherein:

the one-hot vector includes a number of bits corresponding to each of a plurality of events in the software application, one bit of the number of bits in the one-hot vector is set to high, and a position in the one-hot vector of the bit set to high corresponds to an identifier, in a set of unique identifiers, of the respective executed event in the software application;

generating a two-dimensional representation of the obtained user activity history prior to execution of the triggering event by sequentially concatenating the one-hot vectors generated for each respective event in the obtained user activity history, wherein the two-dimensional representation of the obtained user activity history encodes timing relationships on a first axis and events executed within the software application on a second axis;

requesting, from a predictive model, predictive scores for a set of content items based on the obtained user activity history prior to execution of the triggering event, wherein:

the predictive model has been trained using vectors correlating user activity history within the software application correlated to content interaction history recorded for a plurality of users of the software application, each vector correlates information about user actions performed within the software application prior to the triggering event and content viewed by one of the plurality of users subsequent to the triggering event, and the predictive scores indicate a likelihood that each content item in the set of content items would be relevant to the one of the plurality of users based on the obtained user activity history prior to execution of the triggering event;

ranking the content items in the set of content items based on the predictive scores for each content item;
selecting a subset of the set of content items to display to the user based on the ranking of the content items; and
outputting the selected subset of content items for display to the user of the software application.

* * * * *